(12) United States Patent
Markhasin et al.

(10) Patent No.: US 12,206,828 B2
(45) Date of Patent: Jan. 21, 2025

(54) IMAGE PROCESSING CIRCUITRY AND IMAGE PROCESSING METHOD

(71) Applicant: Sony Semiconductor Solutions Corporation, Atsugi (JP)

(72) Inventors: Lev Markhasin, Stuttgart (DE); Stephen Tiedemann, Stuttgart (DE); Stefan Uhlich, Stuttgart (DE); Bi Wang, Stuttgart (DE)

(73) Assignee: SONY SEMICONDUCTOR SOLUTIONS CORPORATION, Atsugi (JP)

( * ) Notice: Subject to any disclaimer, the term of this patent is extended or adjusted under 35 U.S.C. 154(b) by 184 days.

(21) Appl. No.: 18/015,961

(22) PCT Filed: Jul. 19, 2021

(86) PCT No.: PCT/EP2021/070106
§ 371 (c)(1),
(2) Date: Jan. 13, 2023

(87) PCT Pub. No.: WO2022/018012
PCT Pub. Date: Jan. 27, 2022

(65) Prior Publication Data
US 2023/0276146 A1   Aug. 31, 2023

(30) Foreign Application Priority Data

Jul. 22, 2020   (EP) .................................. 20187155

(51) Int. Cl.
*H04N 1/32* (2006.01)
*G06F 16/13* (2019.01)
*G06F 16/18* (2019.01)
*H04N 1/21* (2006.01)
*H04N 25/78* (2023.01)
*H04N 101/00* (2006.01)

(52) U.S. Cl.
CPC ....... *H04N 1/32283* (2013.01); *H04N 1/2129* (2013.01); *H04N 1/32122* (2013.01);
(Continued)

(58) Field of Classification Search
CPC ........... H04N 1/32122; H04N 1/32288; H04N 1/32283; H04N 25/78; H04N 25/77;
(Continued)

(56) References Cited

U.S. PATENT DOCUMENTS

| | | | |
|---|---|---|---|
| 2004/0186858 A1* | 9/2004 | McGovern | G06F 16/181 707/999.2 |
| 2005/0097260 A1* | 5/2005 | McGovern | G06F 21/78 711/100 |

(Continued)

OTHER PUBLICATIONS

International Search Report and Written Opinion mailed on Oct. 26, 2021, received for PCT Application PCT/EP2021/070106, filed on Jul. 19, 2021, 10 pages.

(Continued)

*Primary Examiner* — Marly S Camargo
(74) *Attorney, Agent, or Firm* — XSENSUS LLP

(57) ABSTRACT

An image processing circuitry configured to: store, based on an obtained command, a first image identifier of first image data or the first image data on a write-once-read-many memory, wherein the first image identifier is generated based on the first image data such that it is unique for the first image data.

20 Claims, 11 Drawing Sheets

(52) U.S. Cl.
    CPC ........ *H04N 1/32288* (2013.01); *H04N 25/78* (2023.01); *H04N 2101/00* (2013.01); *H04N 2201/3205* (2013.01); *H04N 2201/323* (2013.01); *H04N 2201/3242* (2013.01)

(58) Field of Classification Search
    CPC ...... H04N 25/772; H04N 25/84; H04N 25/85; H04N 2101/00; H04N 2201/3205; H04N 2201/323; H04N 2201/3242; G06F 16/181; G06F 16/13; G06F 2206/1014
    See application file for complete search history.

(56) References Cited

U.S. PATENT DOCUMENTS

2011/0082966 A1    4/2011    Yu et al.
2022/0164387 A1*  5/2022    Patel ...................... G06F 16/13

OTHER PUBLICATIONS

Neville et al., "Audit Log for Forensic Photography", Internet of Things IoT Infrastructure, ICST Institute for Computer Sciences, Social Informatics and Telecommunications Engineering, LNICST, vol. 8, Available Online At: URL: http://link.springer.com/content/pdf/10.1007/978-3-642-02312-5_16, Jan. 1, 2009, pp. 142-152.

Paul A. Blythe Sr., "Biometric Authentication System for Secure Digital Cameras", Dissertation, XP002413048, May 6, 2005, pp. 1-120.

Tucek et al., "Trade-Offs in Protecting Storage: A Meta-Data Comparison of Cryptographic, Backup/Versioning, Immutable/Tamper-Proof, and Redundant Storage Solutions", 22nd IEEE / 13th NASA Goddard Conference on Mass Storage Systems and Technologies (MSST'05), Apr. 11-14, 2005, 12 pages.

Pawel Korus, "Digital Image Integrity—A Survey of Protection and Verification Techniques", Digital Signal Processing, vol. 71, Dec. 31, 2017, pp. 1-26.

* cited by examiner

100

```
┌─────────────────────────────────────────────────────────────┐
│ Storing, based on an obtained command, a first image       │
│ identifier of first image data or the first image data on a │
│ write-once-read-many memory, wherein the first image       │
│ identifier is generated based on the first image data such │
│ that it is unique for the first image data 101             │
└─────────────────────────────────────────────────────────────┘
                              │
┌─────────────────────────────────────────────────────────────┐
│ Storing the first image identifier or the first image data │
│ on the write-once-read-many memory only if a first          │
│ predetermined secret key stored on a first memory and a     │
│ second predetermined secret key stored on the              │
│ write-once-read-many are identical 102                     │
└─────────────────────────────────────────────────────────────┘
                              │
┌─────────────────────────────────────────────────────────────┐
│ Storing the first image data on a second memory when the   │
│ first image identifier is stored on the write-once-read-    │
│ many memory 103                                             │
└─────────────────────────────────────────────────────────────┘
                              │
┌─────────────────────────────────────────────────────────────┐
│ Retrieving the first image identifier from the write-once-  │
│ read-many memory when the first image data is retrieved     │
│ from the second memory 104                                  │
└─────────────────────────────────────────────────────────────┘
                              │
┌─────────────────────────────────────────────────────────────┐
│ Outputting an indication whether the first image identifier │
│ and a second image identifier, generated based on obtained │
│ second image data, are identical 105                       │
└─────────────────────────────────────────────────────────────┘
                              │
┌─────────────────────────────────────────────────────────────┐
│ Outputting an indication whether the first image identifier │
│ and an obtained third image identifier are identical 106   │
└─────────────────────────────────────────────────────────────┘
                              │
┌─────────────────────────────────────────────────────────────┐
│ Obtaining the command in response to a user operation 107  │
└─────────────────────────────────────────────────────────────┘
```

Fig. 8

A
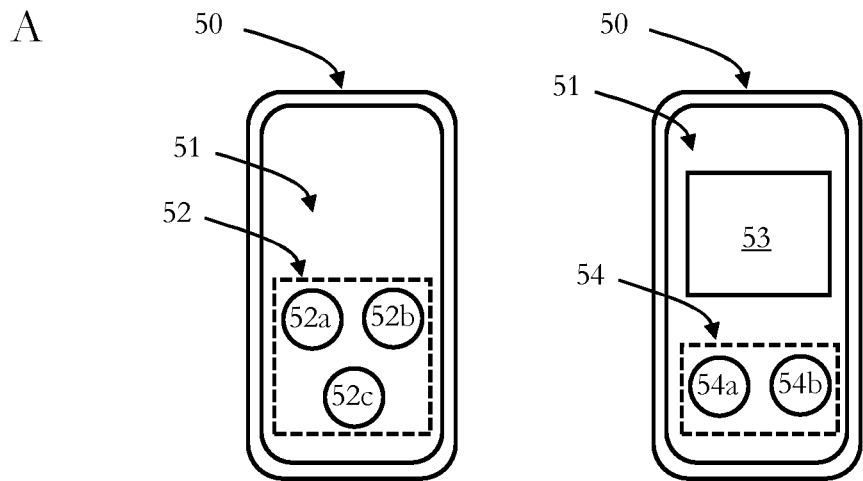
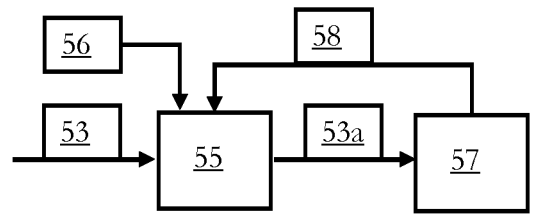
B
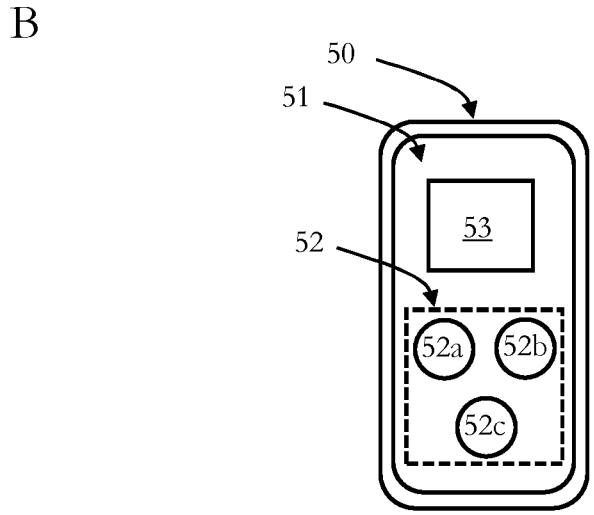
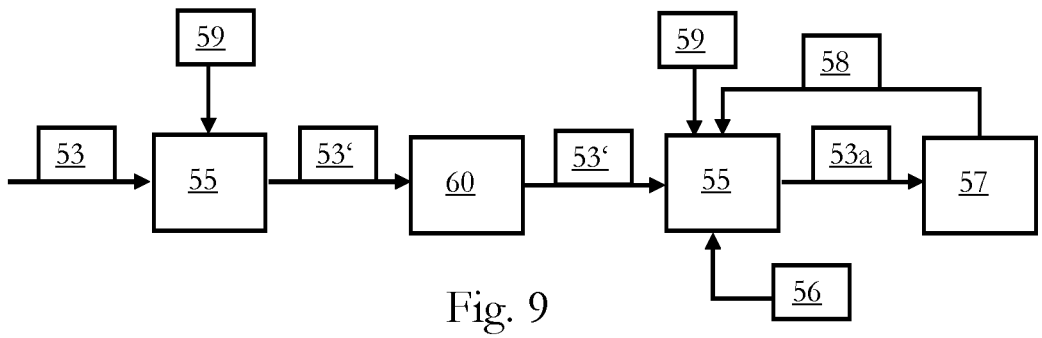
Fig. 9

300

```
Encrypting, based on an obtained secret key, obtained image data and
store the secret key encrypted image data 301

Decrypting, based on the obtained secret key, the secret key encrypted
image data and encrypting, based on an obtained public key of a receiver
device, the obtained image data in response to an obtained transmission
command 302

Transmitting the public key encrypted image data to the receiver device
303

Deleting the image data in response to successfully transmitting the pub-
lic key encrypted image data to the receiver device 304

Displaying an image represented by the obtained image data to a user on
a display unit after decrypting the secret key encrypted image data 305

Obtaining the transmission command in response to a first user opera-
tion of a first input unit by the user indicating that the user accepts trans-
mitting the displayed image 306

Determining the receiver device in response to a second user operation
of a second input unit by a user 307

Obtaining the public key of the receiver device in response to determin-
ing the receiver device 308
```

Fig. 13

IMAGE PROCESSING CIRCUITRY AND IMAGE PROCESSING METHOD

CROSS-REFERENCE TO RELATED APPLICATIONS

The present application is based on PCT filing PCT/EP2021/070106, filed Jul. 19, 2021, and claims priority to EP application No. 20187155.5, filed Jul. 22, 2020, the entire contents of each are incorporated herein by reference.

TECHNICAL FIELD

The present disclosure generally pertains to an image processing circuitry and an image processing method.

TECHNICAL BACKGROUND

Generally, deep neural networks (DNNs) are known, such as a generative adversarial network, which allow generating an image by a computer that may appear as a real image to the humans' eye.

Moreover, DNNs allow modifying real images by, for example, introducing, exchanging or manipulating parts of the real images by a computer. These manipulations may be difficult to recognize for humans.

As there exist techniques for generating and modifying images by a computer, it is generally desirable to provide a technique for verifying that an image is a real image.

SUMMARY

According to a first aspect the disclosure provides an image processing circuitry configured to:
  store, based on an obtained command, a first image identifier of first image data or the first image data on a write-once-read-many memory, wherein the first image identifier is generated based on the first image data such that it is unique for the first image data.

According to a second aspect the disclosure provides an image processing method comprising:
  storing, based on an obtained command, a first image identifier of first image data or the first image data on a write-once-read-many memory, wherein the first image identifier is generated based on the first image data such that it is unique for the first image data.

Further aspects are set forth in the dependent claims, the following description and the drawings.

BRIEF DESCRIPTION OF THE DRAWINGS

Embodiments are explained by way of example with respect to the accompanying drawings, in which:

FIG. 8 schematically illustrates in a flow diagram a second embodiment of an image processing method according to the first part of the description;

FIG. 9 schematically illustrates in a block diagram two embodiments of an image processing device according to a second part of the description;

FIG. 13 schematically illustrates in a flow diagram a second embodiment of an image processing method according to the second part of the description.

DETAILED DESCRIPTION OF EMBODIMENTS

Part I of the Description

Figure 3:
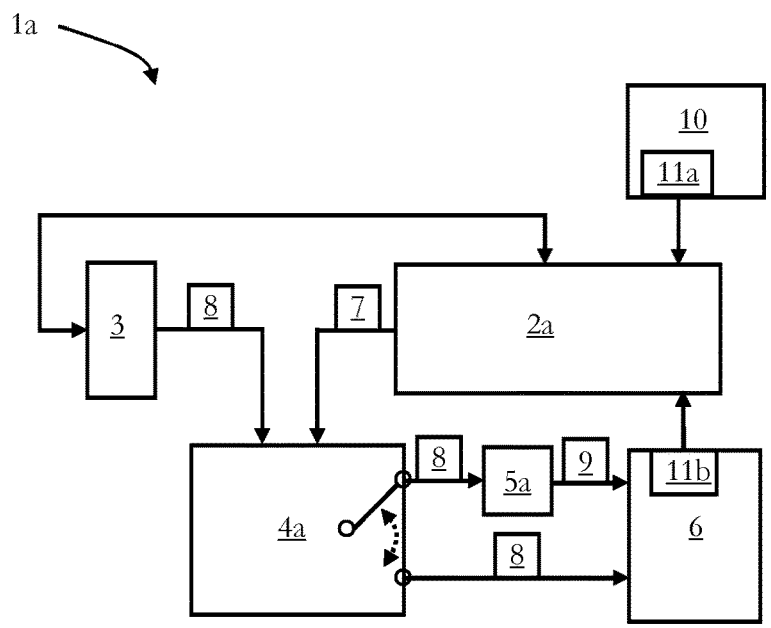
FIG. 3 schematically illustrates in a block diagram a third embodiment of an image processing device including a third embodiment of an image processing circuitry according to the first part of the description.

Before a detailed description of the embodiments under reference of FIG. 3 is given, general explanations are made.

As mentioned in the outset, deep neural networks (DNNs) are known, such as a generative adversarial network, which allow generating an image by a computer that may appear as a real image to the humans' eye.

Moreover, DNNs allow modifying real images by, for example, introducing, exchanging or manipulating parts of the real images by a computer. These manipulations may be difficult to recognize for humans.

Such computer-generated images or computer-modified real images may be problematic, for example, in court trials.

Hence, it has been recognized that it is desirable to provide a technique for verifying that an image is a real image, wherein the real image is an image that is captured with an imaging processing device, e.g., a camera or a mobile device such as a smartphone including an imaging module.

Once it has been verified that an image is a real image, it could be, for example, used in court trials as evidence.

Moreover, it has been recognized that it is desirable to provide a technique for verifying that an image has been taken with a specific camera, for example, to verify an ownership of the real image.

Such image verification techniques may be interesting, e.g., for journalists to prove, on the one hand, that an image is a real image and, on the other hand, that the image has been taken with, for example, their camera such that journalists can claim the ownership of the image.

It has been recognized that the storage of a digital fingerprint (image identifier) of an image which is unique for the image—along with the storage of the image—allows to verify that the image is real and has been taken with a specific camera.

It has further been recognized that an image captured with a specific camera, wherein the captured image is immutably stored on a memory associated with the specific camera, allows to verify that the image is real and has been taken with the specific camera.

Consequently, some embodiments pertain to an image processing circuitry configured to store, based on an obtained command, a first image identifier of first image data or the first image data on a write-once-read-many memory, wherein the first image identifier is generated based on the first image data such that it is unique for the first image data.

The image processing circuitry may be included or may be part of an image processing device such as a camera, a mobile device, e.g., a smartphone including an imaging module.

The image processing circuitry may be based on or may include or may be implemented by electronic components (e.g. electronic switches, transistors, comparators, analog/digital electronic memory, etc.) configured to achieve the functionality as described herein.

The image processing circuitry may be based on or may include or may be implemented as integrated circuitry logic and the functionality may be implemented by software executed by a processor or the like. The image processing circuitry may be based on or may include or may be implemented by a CPU (central processing unit), a microcontroller, an FPGA (field programmable gate array), an ASIC (application specific integrated circuit) or the like.

The image processing circuitry may be based on or may include or may be implemented in parts by electronic components and integrated circuitry logic and in parts by software.

The image processing circuitry may include an image sensor for generating image data. The image sensor may include pixel circuitry (control, timing, driving units, signal processing, etc.) having a plurality of pixels (arranged according to a predetermined pattern, e.g., in rows and columns in the image sensor) generating an electric signal in accordance with an amount of light incident onto each of the plurality of pixels.

The command may be or may be represented by an electric signal (e.g. analog or digital electronic signal).

The command may be obtained in response to a user operation on an input unit operated by a user such as mechanical button on a camera which, when operated by the user, generates an electric signal in accordance with the user operation (the mechanical button may be coupled to an electric component to generate the electric signal) which is processed by the image processing device to generate the command.

The input unit may be a software-defined button displayed on a display unit (e.g. touch display of a smartphone or the like) of the image processing device which, when touched by the user on the touch display (user touch operation), generates an electric signal in accordance with the user touch operation which is processed by the image processing device to generate the command.

The command may be obtained in response to an image analysis result of image data, for example, the image processing device may analyze image data generated by an image sensor and may generate the command based on an analysis result of the image data obtained by analyzing the image data.

The command may be generated automatically, for example, based on a predetermined time or the like.

The first image identifier is an identifier (e.g. represented by a digital value) of first image data that is unique for the first image data. The first image identifier may be a hash key or the like.

The first image data is data generated by an image sensor in accordance with an amount of light incident onto the image sensor. The first image data represent an (real) image captured with an image processing device such as a camera. The first image data may be based on or may include digital values obtained from an analog signal (electric) generated by a plurality of pixels in accordance with the amount of light incident on each of the plurality of pixels. The first image data may be obtained from the image sensor or may be obtained from a memory or the like.

The write-once-read-many (WORM) memory is a data storage device (electronic memory) on which data can be immutably stored. In other words, once the data is stored on the WORM memory, it cannot be modified, but it can be read many times. The WORM memory may be based on or may include or may be implemented by, for example, (integrated) semiconductor memory (storage) technology, magnetic storage technology or the like, as generally known by the skilled person. The WORM memory may be a feature, for example, for a security camera.

The first image identifier is generated (calculated) based on the first image data. This allows to generate (calculate) an identifier of the first image data uniquely identifying the first image data, since it is generated (calculated) based on the concrete pixel values (digital values) representing an (real) image.

For enhancing the general understanding of the present disclosure, two more general embodiments of an image processing device will be discussed under reference of FIG. 1 and FIG. 2 in the following, on which other embodiments may be based or which may be implemented in other embodiments.

Figure 1:
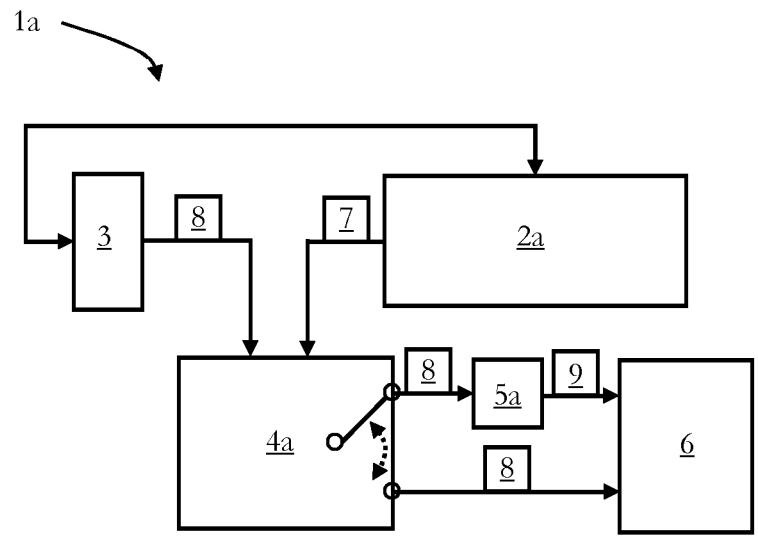
FIG. 1 schematically illustrates in a block diagram a first embodiment of an image processing device including a first embodiment of an image processing circuitry according to a first part of the description.

FIG. 1 schematically illustrates in a block diagram a first embodiment of an image processing device 1a including a first embodiment of an image processing circuitry 4a.

The image processing device 1a includes a control 2a, an image sensor 3, the image processing circuitry 4a, an image identifier generator 5a and a write-once-read-many (WORM) memory 6.

The image processing device 1a is a (digital) camera including optical components for imaging light of a scene onto the image sensor 3 for capturing an (real) image of the scene represented by digital values (pixel values).

The control 2a includes circuitry (e.g. a CPU, a memory, a communication interface, etc.) for controlling the overall function of the image processing device 1a. The control 2a controls the timing of the image capturing (or image data generation) performed by the image sensor 3.

The control 2a generates a command 7 and sends the generated command 7 to the image processing circuitry 4a.

The image sensor 3 generates (first) image data 8 in accordance with an amount of light gathered from the scene and imaged onto the image sensor 3. The image sensor 3 sends the image data 8 to the image processing circuitry 4a. The image sensor 3 may send the image data 8 to the control 2a as well for generating the command 7.

The image processing circuitry 4a obtains the command 7 and the image data 8. The image processing circuitry 4a includes electronic components (e.g. an electronic switch) which stores, based on the received command 7, the image data 8 on the WORM memory 6 or sends the image data 8 to the image identifier generator 5a. This functionality is illustrated in FIG. 1 as the switch in the block of the image processing circuitry 4a.

The image identifier generator 5a includes electronic components (e.g. an ASIC) which generates (calculates) a hash key 9 ((first) image identifier) based on the image data 8 and stores the hash key 9 on the WORM memory 6.

Accordingly, based on the obtained command 7, the image processing circuitry 4a immutably stores either the (first) image data 8 or the (first) image identifier 9 on the WORM memory 6.

Figure 2:
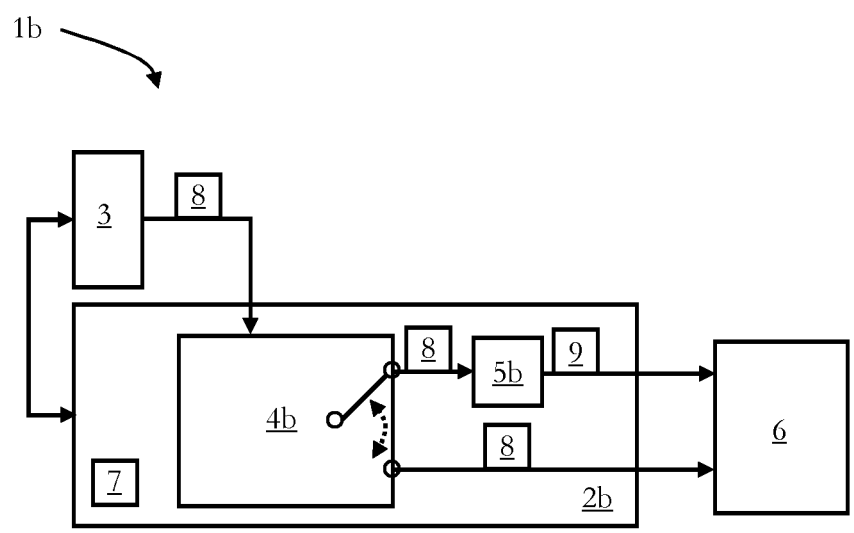
FIG. 2 schematically illustrates in a block diagram a second embodiment of an image processing device including a second embodiment of an image processing circuitry according to the first part of the description.

FIG. 2 schematically illustrates in a block diagram a second embodiment of an image processing device 1b including a second embodiment of an image processing circuitry 4b.

The implementation of the first embodiment of the image processing circuitry 4a of the first embodiment of the image processing device 1a, as discussed under reference of FIG. 1, basically corresponds to a hardware implementation based on electronic components. The implementation of the image identifier generator 5a of the first embodiment, as discussed under reference of FIG. 1, basically corresponds to a hardware implementation as well.

The implementation of the second embodiment of the image processing circuitry 4b of the second embodiment of the image processing device 1b, as will be discussed in the following under reference of FIG. 2, basically corresponds to a software implementation.

All entities which have basically the same function and configuration as in the first embodiment of FIG. 1 are denoted with the same reference numeral.

The image processing device 1b includes a control 2b, the image sensor 3, the image processing circuitry 4b, an image identifier generator 5b and the WORM memory 6.

The image processing device 1b is a (digital) camera including optical components for imaging light of a scene onto the image sensor 3 for capturing an (real) image of the scene represented by digital values.

The control 2b includes circuitry (e.g. a CPU, a memory, a communication interface, etc.) for controlling the overall function of the image processing device 1b. The control 2b controls the timing of the image capturing (or image data generation) performed by the image sensor 3.

The image sensor 3 generates (first) image data 8 in accordance with an amount of light gathered from the scene and imaged onto the image sensor 3. The image sensor 3 sends the image data 8 to the control 2b.

The control 2b includes the image processing circuitry 4b and the image identifier generator 5b. The control 2b generates a command 7. The control 2b obtains the image data 8.

The image processing circuitry 4b is implemented by software which is executed by the control 2b. The image processing circuitry 4b stores, based on the generated command 7, the image data 8 on the WORM memory 6 or sends the image data 8 to the image identifier generator 5b. This functionality is illustrated in FIG. 2 as the switch in the block of in the image processing circuitry 4b.

The image identifier generator 5b is implemented by software which is executed by the control 2b. The image identifier generator 5b generates (calculates) a hash key 9 ((first) image identifier) based on the image data 8 and stores the hash key 9 on the WORM memory 6.

Accordingly, based on the obtained command 7, the image processing circuitry 4b immutably stores either the (first) image data 8 or the (first) image identifier 9 on the WORM memory 6.

Returning to the general explanations, the embodiments as discussed under reference of FIG. 1 and FIG. 2 may allow to verify that a captured image is a real image, since either a hash of the image is immutably stored or the image is immutably stored on the WORM memory at the time of capturing of the image, thereby a real origin of the image may be ensured.

In some embodiments, the first image identifier or the first image data is only stored on the write-once-read-many memory if a first predetermined secret key stored on a first memory and a second predetermined secret key stored on the write-once-read-many are identical.

The first predetermined key (represented by, e.g., digital values) is one of two predetermined keys. The first predetermined key is stored on the first memory different from the WORM memory.

The second predetermined key (represented by, e.g., digital values) is the other one of the two predetermined keys and stored on the WORM memory.

The first memory may be a memory of an image processing device (e.g. a memory of a camera) and the first predetermined key may be stored, for example, at the time of fabrication on the first memory of the image processing device.

The same predetermined key may be stored on the WORM memory as the second predetermined key, for example, at the time of fabrication.

In some embodiments, when the image processing device captures an image, both predetermined keys are retrieved and compared. In such embodiments, the (first) image identifier or the (first) image data is only stored on the WORM memory if both keys are identical (in a case that both keys are not identical the (first) image identifier may not be generated).

This may ensure that only the image processing device can write onto the WORM memory that is paired, for example, at the time of fabrication with the WORM memory.

In some embodiments, the image processing circuitry is further configured to store the first image data on a second memory when the first image identifier is stored on the write-once-read-many memory.

The second memory may be a memory of an image processing device (e.g. a memory of a camera) or may be a detachable SD (secure digital) memory card. If the second memory is a memory of the image processing device, the first memory and the second memory may be the same (which may reduce, for example, costs and/or device complexity).

Accordingly, in addition to storing the first image identifier of the first image data on the WORM memory, the first image data is also stored on the second memory.

In some embodiments, the first image identifier stored on the WORM is associated with the first image data stored on the second memory based on a time stamp, a number (e.g. identification number) or the like.

Generally, when an image is retrieved from a memory of an image processing device (e.g. a mobile device or a camera), it may not be clear whether it is a real image or not.

Hence, in some embodiments, the image processing circuitry is further configured to retrieve the first image identifier from the write-once-read-many memory when the first image data is retrieved from the second memory.

Accordingly, when a user retrieves an image, the user gets the image data (pixel values) as well as the image identifier (e.g. a hash key) and, hence, can verify that the image has been taken with this specific image processing device (e.g. camera).

In some embodiments, the image processing circuitry is further configured to output an indication whether the first image identifier and a second image identifier, generated based on obtained second image data, are identical.

The second image data may be obtained from a (external) memory or may be input via a communication interface or the like. The second image data may be data generated by an image sensor in accordance with an amount of light incident onto the image sensor. The second image data may represent an (real) image captured with an image processing device such as a camera. The second image data may represent a computer-generated image or a manipulated real image or the like. The second image data may be based on or may include digital values.

The second image identifier is generated based on the obtained second image data and a comparison to the first image identifiers stored on the WORM memory is performed.

The output may be an electric signal indicating whether the second image identifier is stored on the WORM memory and, thus, indicating whether both image identifiers are identical. Hence, it can be verified whether the second image (second image data) has been taken with a specific image processing device.

In some embodiments, the image processing circuitry is further configured to output an indication whether the first image identifier and an obtained third image identifier are identical.

The third image identifier may be obtained from a (external) memory or may be input via a communication interface or the like.

The output may be an electric signal indicating whether the third image identifier is stored on the WORM memory and, thus, indicating whether both image identifiers are identical. Hence, it can be verified whether an image corresponding to the third image identifier has been taken with a specific image processing device.

In some embodiments, the command is obtained in response to a user operation.

As discussed above, the command may be or may be represented by an electric signal (e.g. analog or digital electronic signal).

In such embodiments, the command is obtained in response to a user operation on an input unit operated by a user such as a mechanical button on a camera or software-defined button which, when operated by the user, generates an electric signal in accordance with the user operation.

Such an input unit may allow a user to switch between the storage of the first image identifier or the first image data on the WORM memory depending on the situation. When, for example, the user observes a scene including, e.g., a car accident or the like, the user may operate the input unit in order to switch the storage from the first image identifier to the storage of the first image data.

This may allow a varying level of price-security trade-off when recording an image (storing the full image data in a case of an accident may require more memory but may be used in court as evidence).

Alternatively, in some embodiments, the command is obtained in response to an image analysis result of the first image data. In such embodiments, the image processing circuitry is further configured to perform image analysis of the first image data. The image analysis may be based on or may include calculations according to a neural network. The neural network may be trained on, for example, images including scenes of an accident, a crime scene or the like. The neural network may output a probability whether an accident, a crime scene or the like is present in the imaged scene represented by the first image data. The image analysis result may be based on the output of the neural network.

In some embodiments, the image processing circuitry includes the write-once-read-many memory, an image sensor generating the first image data, and an image identifier generator generating the first image identifier based on the generated first image data such that it is unique for the first image data.

The image sensor may be a CCD (charged-coupled device) sensor, an active pixel sensor based on CMOS (complementary metal oxide semiconductor) technology, a photodiode array or the like.

As discussed above, the image sensor may include pixel circuitry (control, timing, driving units, signal processing, etc.) having a plurality of pixels (arranged according to a predetermined pattern, e.g., in rows and columns in the image sensor) generating an electric signal in accordance with an amount of light incident onto the plurality of pixels.

The image identifier generator may be based on or may include or may be implemented by electronic components configured to achieve the functions as described herein.

The image identifier generator may be based on or may include or may be implemented as integrated circuitry logic and the functionality may be implemented by software executed by a processor or the like. The image identifier generator may be based on or may include or may be implemented by a CPU (central processing unit), a microcontroller, an FPGA (field programmable gate array), an ASIC (application specific integrated circuit) or the like.

The image identifier generator may be based on or may include or may be implemented in parts by electronic components and integrated circuitry logic and in parts by software.

In some embodiments, each of the image identifier generator and the write-once-read-many memory is provided as a separate system-on-a-chip component. This may increase security due to the binding of functionality to the (wired) structural components which may be more difficult to compromise. This may further ensure exclusive write access of the image identifier generator and/or the image sensor to the WORM memory by hardware configuration which may further increase security.

In some embodiments, the write-once-read-many memory is detachable from the image processing circuitry. This may be similar, for example, to an SD memory card (as may be used for the image data itself).

Instead of having the image identifier generator and the WORM memory as separate system components, either of them or both may be stacked on top of the image sensor as one monolithic component.

Hence, in some embodiments, the image sensor and the write-once-read-many memory are provided as a stacked monolithic component. This may further increase security due to the binding of functionality to the (wired) structural components which may be even more difficult to compromise.

In some embodiments, the image sensor, the write-once-read-many memory and the image identifier generator are provided as a stacked monolithic component.

In some embodiments, as discussed above, the image processing circuitry further includes an input unit operable by the user, wherein the command is obtained in response to the operation of the input unit by the user.

Some embodiments pertain to an image processing method including storing, based on an obtained command, a first image identifier of first image data or the first image data on a write-once-read-many memory, wherein the first image identifier is generated based on the first image data such that it is unique for the first image data, as described herein.

The image processing method may be based on or may be implemented by electronic components, integrated circuitry logic, CPU, FPGA, software or in parts by electronic components and in parts by software executed by a processor or the like.

The methods as described herein are also implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

Returning to FIG. 3, which schematically illustrates in a block diagram a third embodiment of an image processing device 1a including a third embodiment of an image processing circuitry 4a, the third embodiment is discussed in the following.

The third embodiment is based on the embodiment discussed under reference of FIG. 1 and all entities which have basically the same function and configuration as in the first embodiment of FIG. 1 are denoted with the same reference numeral.

The image processing device 1a further includes a first memory 10.

The first memory 10 is a memory of the image processing device 1a on which a first predetermined secret key 11a is stored.

The WORM memory 6 stores a second predetermined secret key 11b.

When an image is captured (generation of the image data 8 by the image sensor 3), the first predetermined secret key 11a and the second predetermined secret key 11b are retrieved and compared by the control 2a.

Then, the image data 8 or the image identifier 9 is only stored on the WORM memory 6 if the first predetermined secret key 11a and the second predetermined secret key 11b are identical.

Figure 4:
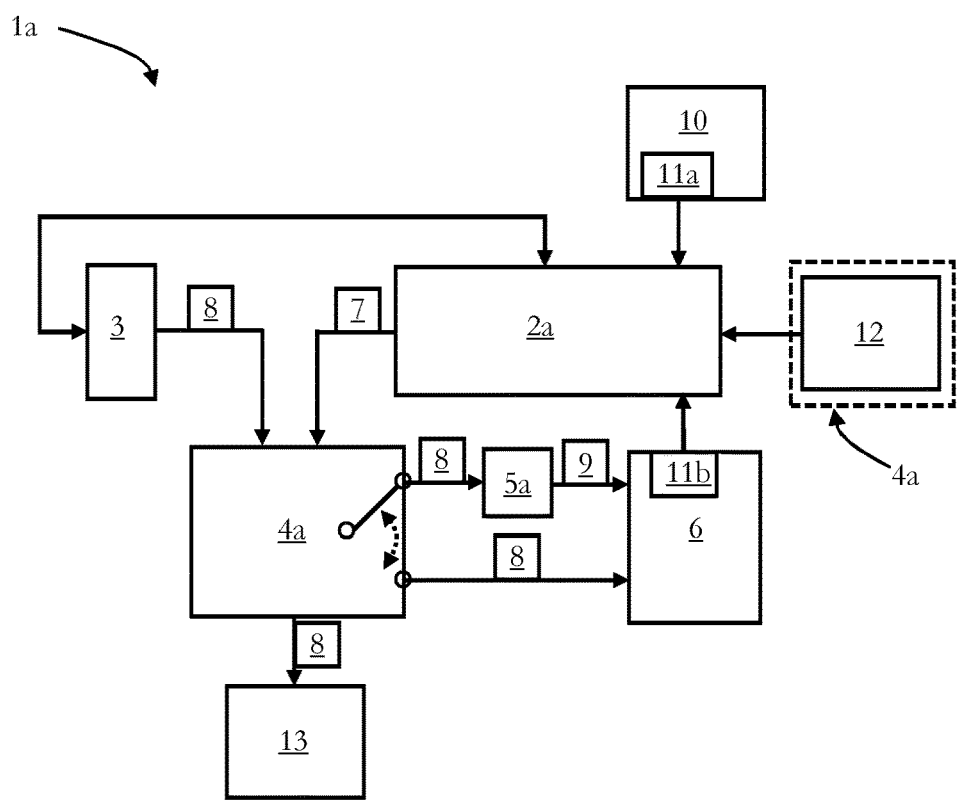
FIG. 4 schematically illustrates in a block diagram a fourth embodiment of an image processing device including a fourth embodiment of an image processing circuitry according to the first part of the description.

FIG. 4 schematically illustrates in a block diagram a fourth embodiment of an image processing device 1a including a fourth embodiment of an image processing circuitry 4a.

The fourth embodiment is based on the embodiment discussed under reference of FIG. 3 and all entities which have basically the same function and configuration as in the third embodiment of FIG. 3 are denoted with the same reference numeral.

The image processing circuitry 4a further includes an input unit 12 as illustrated schematically by the dashed box around the input unit 12 associated with the image processing circuitry 4a.

The image processing device 1a further includes a second memory 13.

The input unit 12 is a mechanical switch or button which, when operated by a user, generates an electric signal in accordance with the user operation. The electric signal is obtained by the control 2a.

The control 2a generates the command 7 in accordance with the user operation of the input unit 12.

Accordingly, the image processing circuitry 4a obtains the command 7 in response to the user operation of the input unit 12.

The second memory 13 is a SD card attachable/detachable to/from the image processing device 1a.

The command 7 indicates that the first image identifier 9 shall be stored on the WORM memory 6 (illustrated by the switch in the block of the image processing circuitry 4a).

When the first image identifier 9 is stored on the WORM memory 6, the image processing circuitry 4a stores the first image data 8 on the second memory 13.

Figure 5:
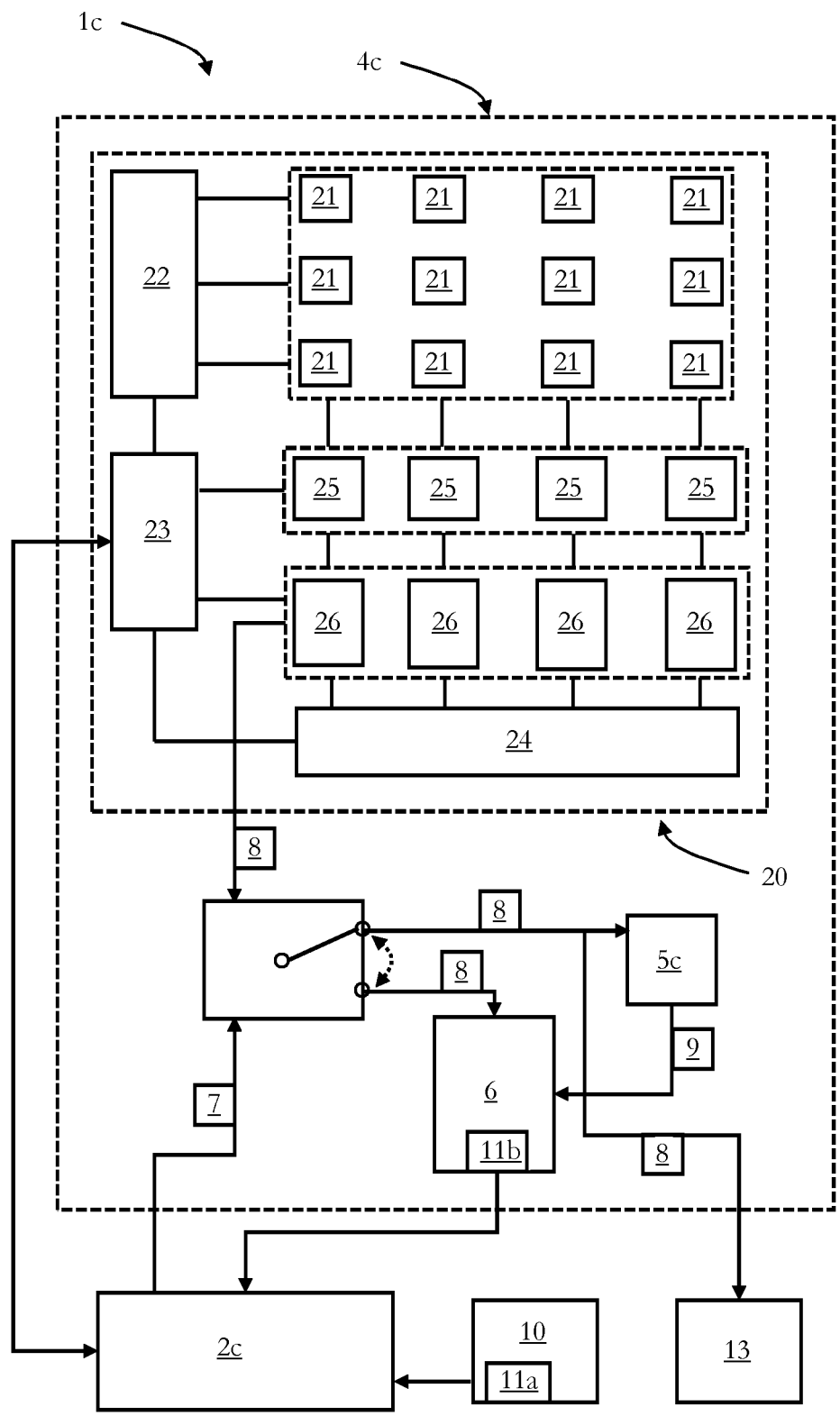
FIG. 5 schematically illustrates in a block diagram a fifth embodiment of an image processing device including a fifth embodiment of an image processing circuitry according to the first part of the description.

FIG. 5 schematically illustrates in a block diagram a fifth embodiment of an image processing device 1c including a fifth embodiment of an image processing circuitry 4c.

The image processing device 1c includes a control 2c, an image processing circuitry 4c, a first memory 10 and a second memory 13. The image processing device 1c or the image processing circuitry 4c includes an input unit 12 (not shown).

The control 2c includes circuitry (e.g. a CPU, a memory, a communication interface, etc.) for controlling the overall function of the image processing device 1c. The control 2c generates a command 7 in response to an operation of a user of the input unit 12.

The first memory 10 is a memory of the image processing device 1c on which a first predetermined secret key 11a is stored.

The second memory 13 is a SD card attachable/detachable to/from the image processing device 1c.

The image processing circuitry 4c includes an image sensor 20, an image identifier generator 5c and a WORM memory 6.

The image sensor 20 includes a plurality of pixels 21, a row selection logic 22, a timing control 23, a column selection logic 24, a plurality of analog signal processors 25 and a plurality of analog-to-digital (AD) converters 26.

The plurality of pixels 21 is arranged according to a predetermined pattern in rows and columns, each pixel of the plurality of pixels 21 generating an electric signal in accordance with an amount of light incident onto the respective pixel.

The row selection logic 22 selects a row of pixels 21 to output the electric signal to the plurality of analog signal processors 25.

The timing control 23 controls the timing of the row selection logic 22, the column selection logic 24, the plurality of analog signal processors 25 and the plurality of AD converters 26.

The column selection logic 24 selects a column of pixels to output the electric to the plurality of analog signal processors 25.

The plurality of analog signal processors 25 performs predetermined analog signal processing (e.g. frequency filtering, smoothing, etc.) on the electric signal obtained from the plurality of pixels 21 and outputs a processed signal to the plurality of AD converters.

The plurality of AD converters 26 converts the processed signal into digital values (pixel values), thereby generating first image data 8. The plurality of AD converters 26 outputs the first image data 8.

The image identifier generator 5c is implemented as a system-on-a-chip (SoC) and generates a hash key 9 (first image identifier) based on the first image data 8.

The WORM memory 6 is implemented as a SoC and stores a second predetermined secret key 11b. Alternatively, the WORM memory 6 and the image sensor 20 may be provided as a stacked monolithic component. Alternatively, the image identifier generator 5c, the WORM memory 6 and the image sensor 20 may be provided as a stacked monolithic component.

When an image is captured (generation of the first image data 8) by the image sensor 20, the first predetermined secret key 11a and the second predetermined secret key 11b are retrieved and compared by the control 2c.

Based on the command 7, the WORM memory 6 stores the first image data 8 or the first image identifier 9 (illustrated by a switch), wherein the first image data 8 or the first image identifier 9 is only stored on the WORM memory 6 if the first predetermined secret key 11a and the second predetermined secret key 11b are identical.

Moreover, when the first image identifier 9 is stored on the WORM memory 6, the image processing circuitry 4c stores the first image data 8 on the second memory 13.

Figure 6A:
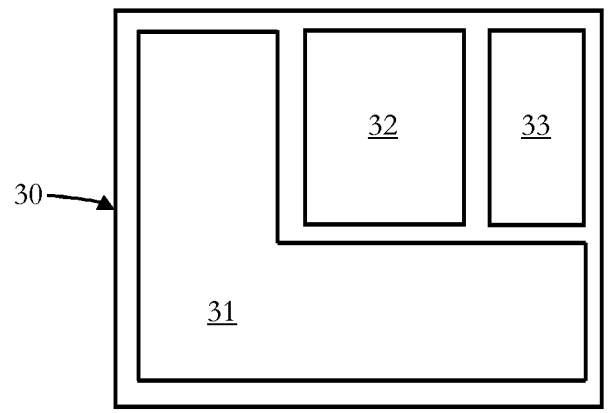
FIG. 6 schematically illustrates embodiments of configurations of an image processing circuitry according to the first part of the description.
Figure 6B:
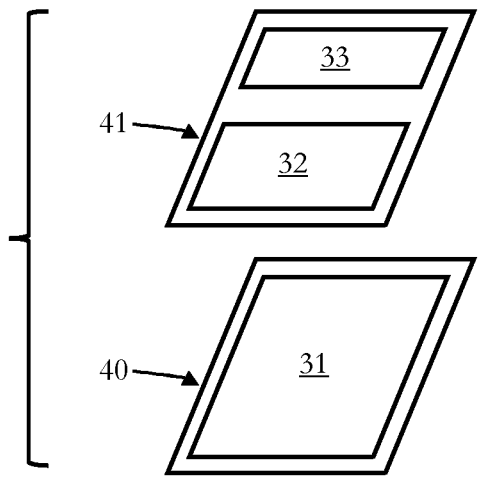
Figure 6C:
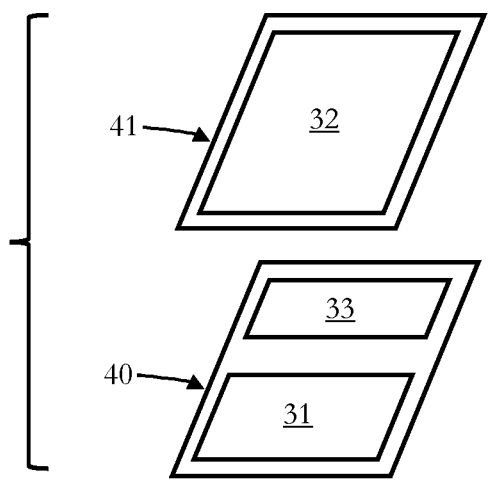

Different embodiments of configurations of an image processing circuitry 30, schematically illustrated in block diagrams, are discussed under reference of FIG. 6A, FIG. 6B and FIG. 6C.

FIG. 6A schematically illustrates an image processing circuitry 30 in a flat configuration on a single semiconductor chip such as, for instance, the image processing circuitry 4c of the embodiment discussed under reference of FIG. 5.

The image processing circuitry 30 includes a logic circuit 31 for signal processing, a pixel circuit 32 and a control unit 33.

The logic circuit 31 includes, for example, the plurality of analog signal processors 25, the plurality of analog-to-digital (AD) converters 26, the image identifier generator 5c and the WORM memory 6.

The pixel circuit 32 includes, for example, the plurality of pixels 21, the row selection logic 22 and the column selection logic 24.

The control unit 33 is, for example, the timing control 23.

FIG. 6B schematically illustrates an image processing circuitry 30 in a first stacked configuration. The image processing circuitry 4c of the embodiment discussed under reference of FIG. 5, for example, may be implemented in such a first stacked configuration. The first stacked configuration may correspond to a front-side illuminated image sensor.

In the first stacked configuration, the logic circuit 31, for example, according to the embodiment as discussed under reference of FIG. 6A, is mounted on a first semiconductor chip section 40.

The pixel circuit 32 and the control unit 33, for example, according to the embodiment as discussed under reference of FIG. 6A, are mounted on a second semiconductor chip section 41.

FIG. 6C schematically illustrates an image processing circuitry 30 in a second stacked configuration. The image processing circuitry 4c of the embodiment discussed under reference of FIG. 5, for example, may be implemented in such a second stacked configuration. The second stacked configuration may correspond to a back-side illuminated image sensor.

In the second stacked configuration, the logic circuit 31 and the control unit 33, for example, according to the embodiment as discussed under reference of FIG. 6A, are mounted on the first semiconductor chip section 40.

The pixel circuit 32, for example, according to the embodiment as discussed under reference of FIG. 6A, is mounted on the second semiconductor chip section 41.

It should be recognized that the embodiments of FIG. 6A, FIG. 6B and FIG. 6C describe a flat configuration, a first stacked configuration and a second stacked configuration with an exemplary configuration of the logic circuit 31, the pixel circuit 32 and the control unit 33. The specific configuration of the logic circuit 31, the pixel circuit 32 and the control unit 33 is however given for illustrative purposes only and should not be construed as binding. For example, the logic circuit 31 may include only the image identifier generator 5c and the WORM memory 6. Any other configurations may be apparent to the skilled person.

Figure 7:
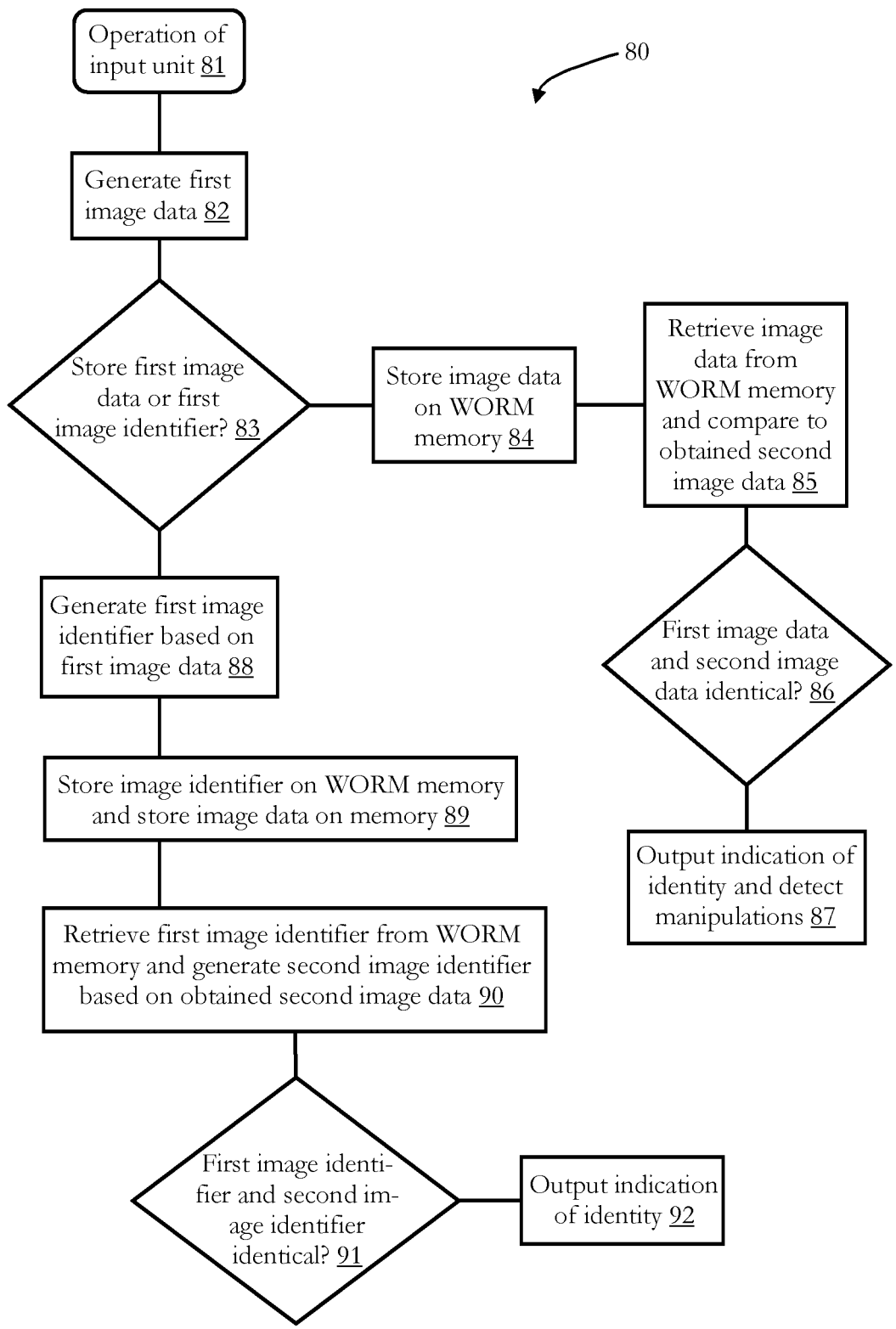
FIG. 7 schematically illustrates in a flow diagram a first embodiment of an image processing method according to the first part of the description.

A first embodiment of an image processing method 80, schematically illustrated in a flow diagram, is discussed under reference of FIG. 7.

The image processing method 80 is performed by the image processing circuitry 4c of FIG. 5 included in the image processing device 1c.

At 81, a user operates an input unit 12 (not in shown in FIG. 5), thereby generating an electric signal on which basis the command 7 is generated.

At 82, first image data 8 is generated by the image sensor 20 (an (real) image is captured).

At 83, it is determined, based on the generated command 7, whether the first image data 8 shall be stored or a first image identifier 9 of the first image data 8 shall be stored on the WORM memory 6.

Typically, the user may prefer to store the first image identifier 9 where each captured image is stored on a separate device memory (second memory 13), for example, for saving data storage capacities which may be cheaper.

In this case, before the (raw) image data 8 leaves the image processing circuitry 4c, the first image identifier 9 (e.g. hash key) is generated and stored on the WORM memory 6.

However, assuming the user is involved in an accident, the user may prefer to store the (raw) image data 8 on the WORM memory 6.

At 84, it has been determined that the first image data 8 shall be stored and, accordingly, the first image data 8 is stored on the WORM memory 6 (without any preprocessing).

Assuming the user must provide a proof to authorities that the image (represented by the first image data 8) is a real image or has not been manipulated, then, at 85, the WORM memory 6 is read (the first image data 8 is retrieved).

At 86, the retrieved image data 8 is then compared to obtained second image data. The second image data may be a manipulated version of the first image data 8 or the like.

At 87, an indication whether the two images are identical is output, thereby manipulations can be detected. At least it is detected whether the two images are different. Moreover, for example, if it is detected that the two images are different, the parts of the image(s) which are different or which have been manipulated may be determined. Then, the user may want to see what parts of the two images are different and, thus, these parts may be highlighted and the images including the highlighted parts may be shown to the user for verification.

At 88, it has been determined that the first image identifier 9 shall be stored and, accordingly, the first image identifier 9 is generated and stored on the WORM memory 6 at 89.

Assuming the user must provide a proof to authorities that the image (represented by the first image data 8) is a real image or has not been manipulated, then, at 90, the WORM memory 6 is read to retrieve the first image identifier 9. Moreover, at 90, a second image identifier is generated based on obtained second image data. The second image data may be image data that is supposed to produce the first image identifier or that may be a manipulated version of the first image data 8 or the like.

Then, at 91, the first image identifier 9 and the second image identifier are compared.

At 92, an indication whether the two image identifiers are identical is output, thereby manipulations can be detected.

Generally, storing the first image identifier 9 on the WORM memory 6, on the one hand, may reduce required storage capacities compared to storing the first image data 8 on the WORM memory 6. However, on the other hand, storing the first image data 8 on the WORM memory 6 may allow an easier detection of manipulations or manipulated parts, since two images may be directly compared when read-out, as discussed above, thereby manipulated parts may be directly detected, highlighted and shown to a user.

A second embodiment of an image processing method 100, schematically illustrated in a flow diagram, is discussed under reference of FIG. 8.

At 101, the method 100 includes storing, based on an obtained command, a first image identifier of first image data or the first image data on a write-once-read-many memory, wherein the first image identifier is generated based on the first image data such that it is unique for the first image data, as discussed herein.

At 102, the method 100 includes storing the first image identifier or the first image data on the write-once-read-many memory only if a first predetermined secret key stored on a first memory and a second predetermined secret key stored on the write-once-read-many are identical, as discussed herein.

At 103, the method 100 includes storing the first image data on a second memory when the first image identifier is stored on the write-once-read-many memory, as discussed herein.

At 104, the method 100 includes retrieving the first image identifier from the write-once-read-many memory when the first image data is retrieved from the second memory, as discussed herein.

At 105, the method 100 includes outputting an indication whether the first image identifier and a second image identifier, generated based on obtained second image data, are identical, as discussed herein.

At 106, the method 100 includes outputting an indication whether the first image identifier and an obtained third image identifier are identical, as discussed herein.

At 107, the method 100 includes obtaining the command in response to a user operation, as discussed herein.

It should be recognized that the embodiments describe methods with an exemplary ordering of method steps. The specific ordering of method steps is however given for illustrative purposes only and should not be construed as binding. For example, the ordering of 102 and 107 in the embodiment of FIG. 8 may be exchanged. Other changes of the ordering of method steps may be apparent to the skilled person.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) An image processing circuitry configured to:
store, based on an obtained command, a first image identifier of first image data or the first image data on a write-once-read-many memory, wherein the first image identifier is generated based on the first image data such that it is unique for the first image data.

(2) The image processing circuitry of (1), wherein the first image identifier or the first image data is only stored on the write-once-read-many memory if a first predetermined secret key stored on a first memory and a second predetermined secret key stored on the write-once-read-many are identical.

(3) The image processing circuitry of (1) or (2), wherein the image processing circuitry is further configured to:
store the first image data on a second memory when the first image identifier is stored on the write-once-read-many memory.

(4) The image processing circuitry of (3), wherein the image processing circuitry is further configured to:
retrieve the first image identifier from the write-once-read-many memory when the first image data is retrieved from the second memory.

(5) The image processing circuitry of anyone of (1) to (4), wherein the image processing circuitry is further configured to:
output an indication whether the first image identifier and a second image identifier, generated based on obtained second image data, are identical.

(6) The image processing circuitry of anyone of (1) to (5), wherein the image processing circuitry is further configured to:
output an indication whether the first image identifier and an obtained third image identifier are identical.

(7) The image processing circuitry of anyone of (1) to (6), wherein the command is obtained in response to a user operation.

(8) The image processing circuitry of anyone of (1) to (7), wherein the image processing circuitry includes:
the write-once-read-many memory;
an image sensor generating the first image data; and
an image identifier generator generating the first image identifier based on the generated first image data such that it is unique for the first image data.

(9) The image processing circuitry of (8), wherein each of the image identifier generator and the write-once-read-many memory is provided as a separate system-on-a-chip component.

(10) The image processing circuitry of (9), wherein the write-once-read-many memory is detachable from the image processing circuitry.

(11) The image processing circuitry of (8), wherein the image sensor and the write-once-read-many memory are provided as a stacked monolithic component.

(12) The image processing circuitry of (8), wherein the image sensor, the write-once-read-many memory and the image identifier generator are provided as a stacked monolithic component.

(13) The image processing of anyone of (7) to (12), wherein the image processing circuitry further includes:
an input unit operable by the user, wherein the command is obtained in response to the operation of the input unit by the user.

(14) An image processing method including:
storing, based on an obtained command, a first image identifier of first image data or the first image data on a write-once-read-many memory, wherein the first image identifier is generated based on the first image data such that it is unique for the first image data.

(15) The image processing method of (14), further including:

storing the first image identifier or the first image data on the write-once-read-many memory only if a first predetermined secret key stored on a first memory and a second predetermined secret key stored on the write-once-read-many are identical.

(16) The image processing method of (14) or (15), further including:
storing the first image data on a second memory when the first image identifier is stored on the write-once-read-many memory.

(17) The image processing method of (16), further including:
retrieving the first image identifier from the write-once-read-many memory when the first image data is retrieved from the second memory.

(18) The image processing method of anyone of (14) to (17), further including:
outputting an indication whether the first image identifier and a second image identifier, generated based on obtained second image data, are identical.

(19) The image processing method of anyone of (14) to (18), further including:
outputting an indication whether the first image identifier and an obtained third image identifier are identical.

(20) The image processing method of anyone of (14) to (19), further including:
obtaining the command in response to a user operation.

(21) A computer program comprising program code causing a computer to perform the method according to anyone of (14) to (20), when being carried out on a computer.

(22) A non-transitory computer-readable recording medium that stores therein a computer program product, which, when executed by a processor, causes the method according to anyone of (14) to (20) to be performed.

Part II of the Description

Before a detailed description of the embodiments under reference of FIG. 9 is given, general explanations are made.

Generally, deep neural networks (DNNs) are known, such as a generative adversarial network, which allow generating an image by a computer that may appear as a real image to the humans' eye.

Moreover, DNNs allow modifying real images by, for example, introducing, exchanging or manipulating parts of the real images by a computer. These manipulations may be difficult to recognize for humans.

Generally, images are frequently included in, for example, a website, persist in a database or are stored on a memory without protection (e.g. encrypted) which may increase a possibility of potential abuse of unauthorized copies of an image and it may be difficult to verify an ownership of the image.

Hence, it has been recognized that it is desirable to provide a technique for verifying that an image is a real image, wherein the real image is an image that is captured with an imaging processing device, e.g., a camera or a mobile device such as smartphone including an imaging module It has further been recognized that, for example, if it could be guaranteed that only a single copy of an image exists, the single copy is supposed to be the property of the owner.

Consequently, some embodiments pertain to an image processing circuitry configured to encrypt, based on an obtained public key of a receiver device, obtained image data in response to an obtained transmission command, transmit the encrypted image data to the receiver device, and delete the image data in response to successfully transmitting the encrypted image data to the receiver device.

The image processing circuitry may be included or may be part of an image processing device such as a camera, a mobile device, e.g., a smartphone including an imaging module.

The image processing circuitry may be based on or may include or may be implemented by electronic components (e.g. electronic switches, transistors, comparators, analog/digital electronic memory, wires connectors, etc.) configured to achieve the functionality as described herein.

The image processing circuitry may be based on or may include or may be implemented as integrated circuitry logic and the functionality may be implemented by software executed by a processor or the like. The image processing circuitry may be based on or may include or may be implemented by a CPU (central processing unit), a microcontroller, an FPGA (field programmable gate array), an ASIC (application specific integrated circuit) or the like.

The image processing circuitry may include a communication interface for transmitting data to the receiver device. The communication interface may be based on or may implement wireless or wired communications for directly transmitting to the receiver device or over a network (e.g. Wi-Fi, Bluetooth®, mobile telecommunications system based on, e.g., LTE, Ethernet, etc.). The image processing circuitry may include electronic components for exchanging data with a communication interface of an image processing device (in which the image processing circuitry may be included) for transmitting data to the receiver device.

The image processing circuitry may be based on or may include or may be implemented in parts by electronic components and integrated circuitry logic and in parts by software.

The image processing circuitry may include an image sensor for generating image data. The image sensor may include pixel circuitry (control, timing, driving units, signal processing, etc.) having a plurality of pixels (arranged according to a predetermined pattern, e.g., in rows and columns in the image sensor) generating an electric signal in accordance with an amount of light incident onto each of the plurality of pixels. The image sensor may be a CCD (charged-coupled device) sensor, an active pixel sensor based on CMOS (complementary metal oxide semiconductor) technology, a photodiode array or the like.

The receiver device may be a computer, a mobile device (e.g. smartphone, tablet, etc.), a server, a cloud provider, etc.

The public key of the receiver device is one of the public keys in a public key encryption scheme based on, for example, Diffie-Hellman key exchange.

The public key of the receiver device may be obtained over a communication interface in response to determining or specifying the receiver device. The public key of the receiver device may be obtained from a memory in response to determining or specifying the receiver device, wherein the public key of the receiver is stored in advance on the memory, for example, due to previous use or the like.

An encryption key is derived based on the obtained public key of the receiver device (e.g. asymmetric encryption). The encryption key may be derived further based on a private key or a public key of an image processing device (in which the image processing circuitry may be included) or the like.

The image data is data generated by an image sensor in accordance with an amount of light incident onto the image sensor. The image data represent an (real) image captured with an image processing device such as a camera. The image data may be based on or may include digital values obtained from an analog signal (electric) generated by a plurality of pixels in accordance with the amount of light incident on each of the plurality of pixels. The image data may be obtained from the image sensor or may be obtained from a memory or the like.

The obtained image data is encrypted with the derived encryption key in response to an obtained transmission command.

The transmission command may be obtained in response to a user operation of an input unit by a user such as mechanical button on a mobile device or the like (image processing device) which, when operated by the user, generates an electric signal in accordance with the user operation (the mechanical button may be coupled to an electric component to generate the electric signal) which is processed by the mobile device to generate the transmission command.

The input unit may be a software-defined button displayed on a display unit (e.g. touch display of a smartphone or the like) of the image processing device which, when touched by the user on the touch display (user touch operation), generates an electric signal in accordance with the user touch operation which is processed by the image processing device to generate the transmission command.

For example, a user may capture an image with a smartphone which the user wants to send to a certain recipient (the recipient may want to buy the image for example). Before transmission the image may be displayed to the user on a touch display of the users' smartphone for confirming that the image shall be transmitted. The image may be displayed as a thumbnail to the user.

The transmission command may be obtained (generated) automatically, for example, a user may not want to confirm every image before transmission to a specific recipient and, thus, the transmission command may be generated in response to capturing the image or the like.

The encrypted image data is transmitted to the receiver device.

In some embodiments, the image data is hold as a backup in the image processing circuitry/device Until save receipt of the image data is acknowledged.

In such embodiments, once the receiver device acknowledges successful transmission (reception) of the encrypted image data, the image data is deleted from the image processing circuitry/device.

Here, image data is a general term representing all image data (representing the (transmitted) image) which may be hold in a memory until successful transmission including the raw image data (obtained image data) and the encrypted image data.

The image data may be deleted by overwriting the data in the memory with other data, for example, with random data, predetermined data, etc. Deleting the image data may include deleting the encryption key.

Accordingly, the image processing circuitry may ensure that a recorded image (or video) is either stored on an internal memory, the corresponding image processing device (or an internal memory of it) or was successfully transmitted to the receiver device outside of the image processing device.

In some embodiments, the transmitted image (or video) includes a signed proof (e.g. digital signature or the like) that the named recipient (e.g. the owner of the receiver device) is the legitimate owner of the image.

Generally, images and videos may be protected against malicious manipulation and potential abuse of unauthorized copies.

An exemplary use case of the technology, in some embodiments, is a creation of photographs for identification documents that must (i) be guaranteed to be original and not modified with deepfake or other falsification technology, and (ii) not persist in databases as a privacy measure. Such photographs may otherwise be falsified, which may lead authorities to no longer accept photos created outside of their facilities.

In such use cases a photo studio may continue to create such photographs and guarantees the authority remote access to the image processing device for retrieving the (unique) instance of the identification photo.

Another use case may be that photos (images) may be posted to social media platforms with a realness guarantee.

As mentioned further above, the functionality of the image processing circuitry may be based on or may be implanted by electronic components, an ASIC, a system-on-a-chip, or the like.

In some embodiments, the image processing circuitry is implemented in a stacked configuration.

Generally, in some embodiments, a stacked configuration (a stacked sensor) is a configuration in which an image sensor for generating image data, (at least some) control functions and (at least some) computing capabilities are implemented on separate semiconductor substrates or chips. In such embodiments, the separate chips are arranged on each other and electrically connected. This may increase security, since such a hard-wired solution may be difficult to compromise.

Accordingly, in some embodiments, an image processing device includes an image processing circuitry including an image sensor having some computing capabilities (e.g. as stacked sensor) that can encrypt a captured image, some storage capabilities, a (thumbnail) display, a user interface, a communication interface that can control the image processing device and send information to a receiver device. In some embodiments, on receiver's side there is a partner interface that receives the encrypted image and uses the receiver's CPU to decrypt it.

In some embodiments, an image represented by the obtained image data is displayed to a user on a display unit, and wherein the transmission command is obtained in response to a first user operation of a first input unit by the user indicating that the user confirms transmitting the displayed image.

As discussed above, the transmission command may be obtained in response to a (first) user operation of an (first) input unit by a user such as mechanical button on a mobile device (image processing device) which, when operated by the user, generates an electric signal in accordance with the (first) user operation (the mechanical button may be coupled to an electric component to generate the electric signal) which is processed by the mobile device to generate the transmission command.

The (first) input unit may be a software-defined button (or more than one) displayed on a display unit (e.g. touch display of a smartphone or the like) of the image processing device which, when touched by the user on the touch display (user touch operation), generates an electric signal in accordance with the user touch operation which is processed by the image processing device to generate the transmission command.

In some embodiments, when the image is displayed to the user, the user may decide to confirm to transmit the image to the receiver device or to discard the image by operating the input unit. For example, the input unit may have two software-defined buttons on a touch display, one for confirming the image for transmission and one for discarding the image. This may be important, since the user has no access to the image after transmission. In such embodiments, the image is transmitted to the receiver device by operation of the confirm button by the user and the image is deleted after successful transmission. Moreover, in such embodiments, the image data representing the image is deleted if the user operates the discard button and the image is not transmitted to the receiver device.

In some embodiments, the receiver device is determined in response to a second user operation of a second input unit by a user, and wherein the public key of the receiver device is obtained in response to determining the receiver device.

The second input unit may be a mechanical button on a mobile device or the like (image processing device) which, when operated by the user, generates an electric signal in accordance with the (first) user operation (the mechanical button may be coupled to an electric component to generate the electric signal) which is processed by the mobile device. In response to the electric signal and the processing of it, a menu may be displayed on the display unit of the image processing device for specifying the receiver device by, for example, moving through a list of possible receiver devices by operating the mechanical button or by a touch operation or the like.

The second input unit may be a software-defined button (or more than one) displayed on a display unit (e.g. touch display of a smartphone or the like) of the image processing device which, when touched by the user on the touch display (user touch operation), generates an electric signal in accordance with the user touch operation which is processed by the image processing device to determine the receiver device.

For example, the second input unit may have one or more software-defined buttons on a touch display, each displaying a representation (e.g. a logo, a name, etc.) of the receiver device (or the owner of the receiver device such as a company). The user may touch the respective button to determine the receiver device.

The second input unit may be a drop-down menu or the like.

The second input unit may be a text field for entering the receiver device (e.g. a URL or the like) which may appear after capturing the image or the like.

As discussed above, the public key of the receiver device may be obtained over a communication interface in response to determining or specifying the receiver device. The public key of the receiver device may be obtained from a memory in response to determining or specifying the receiver device, wherein the public key of the receiver is stored in advance on the memory, for example, due to previous use or the like.

Generally, a user may not want to send an image shortly after capturing the image (e.g. the user may not be sure about where to send it due to multiple options or the like) and, thus, the image needs to be stored temporarily on, for example, the users' smartphone. In order to protect the image from manipulations the image should be encrypted before storing it locally until the image is transmitted to a receiver device. This may allow the use of removable memory such as SD (secure digital) memory cards. This may protect against direct memory read attacks if in-built storage is used.

Hence, some embodiments pertain to an image processing circuitry configured to encrypt, based on an obtained secret key, obtained image data and store the secret key encrypted image data, decrypt, based on the obtained secret key, the secret key encrypted image data and encrypt, based on an obtained public key of a receiver device, the obtained image data in response to an obtained transmission command, transmit the public key encrypted image data to the receiver device, and delete the image data in response to successfully transmitting the public key encrypted image data to the receiver device.

In such embodiments, an image represented by the image data is stored encrypted on a memory of an image processing device including the image processing circuitry until the image is transmitted to a receiver device.

The secret key may be a predetermined key (e.g. at the time of fabrication) or may be derived from a predetermined key to generate a (unique) secret key for each image.

The secret key may be derived from a public key of the image processing device to generate a (unique) secret key for each image.

The secret key may be stored on a hardware security element or the like.

Once a user retrieves the image for transmitting it to a receiver device, the secret key encrypted image data is decrypted based on (with) the secret key.

The obtained image data (reobtained after decryption with secret key) is encrypted based on the public key of the receiver device, as discussed above.

The public key encrypted image data is transmitted to the receiver device and the image data (all image data representing the image) is deleted, as discussed above, wherein deleting may also include deleting the secret key if it is a (unique) secret key for each image.

In some embodiments, an image represented by the obtained image data is displayed to a user on a display unit after decrypting the secret key encrypted image data, and wherein the transmission command is obtained in response to a first user operation of a first input unit by the user indicating that the user confirms transmitting the displayed image.

In some embodiments, the receiver device is determined in response to a second user operation of a second input unit by a user, and wherein the public key of the receiver device is obtained in response to determining the receiver device.

Generally, in some embodiments, the receiving device forms a part of a chain of trusted receiving devices, wherein each member of the chain forwards and deletes the image in the same way as the image processing device including the image processing circuitry.

Some embodiments pertain to an image processing method including encrypting, based on an obtained public key of a receiver device, obtained image data in response to an obtained transmission command, transmitting the encrypted image data to the receiver device, and deleting the image data in response to successfully transmitting the encrypted image data to the receiver device.

The image processing method may be based on or may be implemented by electronic components, integrated circuitry logic, CPU, FPGA, software or in parts by electronic components and in parts by software executed by a processor or the like.

Some embodiments pertain to an image processing method including encrypting, based on an obtained secret key, obtained image data and store the secret key encrypted image data, decrypting, based on the obtained secret key, the secret key encrypted image data and encrypting, based on an obtained public key of a receiver device, the obtained image data in response to an obtained transmission command, transmitting the public key encrypted image data to the receiver device, and deleting the image data in response to successfully transmitting the public key encrypted image data to the receiver device.

The image processing method may be based on or may be implemented by electronic components, integrated circuitry logic, CPU, FPGA, software or in parts by electronic components and in parts by software executed by a processor or the like.

The methods as described herein are also implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

Returning to FIG. 9, which schematically illustrates in a block diagram two embodiments of an image processing device, a first embodiment is discussed under reference of FIG. 9A and a second embodiment is discussed under reference of FIG. 9B in the following.

The first embodiment of the image processing device 50, which is a smartphone here, is discussed under reference of FIG. 9A.

The image processing device 50 (the smartphone) generally includes circuitry such as a CPU, memory, a communication interface and the like, as generally known.

The image processing device 50 further includes a display unit 51, an image sensor (not shown) and an image processing circuitry 55.

The display unit 51 is a touch display which, when a user performs a touch operation on the display, generates an electric signal in accordance with the touch operation.

The display unit 51 displays an input unit 52 with the input options 52a, 52b and 52c.

The input options 52a-52c are software-defined buttons. The input option 52a is a first representation of a first receiver device 57 and the input option 52b is a second representation of a second receiver device 57. The input option 52c is a representation of a normal image capturing mode.

When the user touches one of the positions on the touch display 51 where either the input option 52a or 52b is displayed, the receiver device 57 is determined which is represented by the input option 52a or 52b, respectively.

Assuming the user chooses input option 52a, which is a representation of a social media platform, then the receiver device 57 is determined which corresponds to, for example, a server of the social media platform (which may be identified by an URL or the like).

Then, the image processing circuitry 55 obtains a public key 58 of the receiver device 57 by, for example, Diffie-Hellman key exchange.

Moreover, the image processing device 50 switches to an image capturing mode for generating image data 53 representing a captured image.

The skilled person will appreciate that the receiver device 57 may also be determined after capturing and confirming the image 53 for transmission.

The captured image 53 is displayed to a user together with, for example, an input unit 54 with the input options 54a and 54b.

By touching the input option 54a, the user confirms the displayed image 53 and by touching the input option 54b, the user discards the displayed image 53.

This is important because the user will have no access to the photo (image) 53 anymore once the image is transmitted to the receiver device 57. If this is a passport photo, for example, the user may verify that the eyes are open, and the angle is correct and the like. If it is a social media photo, the user may verify that it is aesthetic, no legs are cut-off and the like.

Assuming the user confirms the displayed image 53, i.e. confirms transmitting the displayed image to the receiver device, by touching the input option 54a, a transmission command 56 is generated which is obtained by the image processing circuitry 55.

Then, the image processing circuitry 55 obtains the image data 53 and encrypts the obtained image data based on the obtained public key 58 of the receiver device 57.

The encrypted image data 53a is transmitted to the receiver device 57.

Then, the receiver device 57 acknowledges successful transmission and the image processing circuitry 55 deletes the image data (e.g. from the working memory or a small memory in the image processing circuitry 55 itself).

During the process of encrypting and after transmitting and deleting, the image processing device 50 has no access to the image data 53.

The second embodiment of the image processing device 50 is discussed under reference of FIG. 9B.

In contrast to the embodiment as discussed under reference of FIG. 9A, in this embodiment (secret key encrypted) image data 53' is (temporarily) stored on a memory 60 of the image processing device 50.

The user captures an image 53 with the image processing device 50.

Then, the image processing circuitry 55 obtains the image data 53 and encrypts the obtained image data 53 with a secret key which is stored in a hardware security element.

The secret key encrypted image data 53' is stored on the memory 60.

At some later moment in time, the user retrieves the image 53, wherein the secret key encrypted image data 53' are loaded and decrypted based on the secret key 59.

Then, the user chooses, for example, either input option 52a or 52b to determine the receiver device 57 and obtains the public key 56 of the receiver device 57.

The image processing circuitry 55 encrypts the (re)obtained image data 53 based on the obtained public key 58 of the receiver device 57.

The (public key) encrypted image data 53a is transmitted to the receiver device 57.

Then, the receiver device 57 acknowledges successful transmission and the image processing circuitry 55 deletes the image data 53 (e.g. from the working memory or a small memory in the image processing circuitry 55 itself, the memory 60, etc.).

In this embodiment, the image 53 is only stored encrypted in the memory 60 of the image processing device 50.

In both embodiments discussed under reference of FIG. 9A and FIG. 9B, the image 53 is only be accessible at the receiver's side (no manipulations may be performed on the transmission side). The receiver device 57 receives the photo, may decrypt it and use it.

The receiver device 57 may belong to a buyer who has not only payed for the photo but for the copyright and may be sure that only the buyer has a version of the photo.

Moreover, the receiver device 57 may belong to a passport office receiving passport photos, wherein it may be difficult to manipulate the photo after capturing.

The receiver device 57 may belong to a social media platform, wherein the photo may be posted immediately, and it may be guaranteed that it is an original real image.

Figure 10:
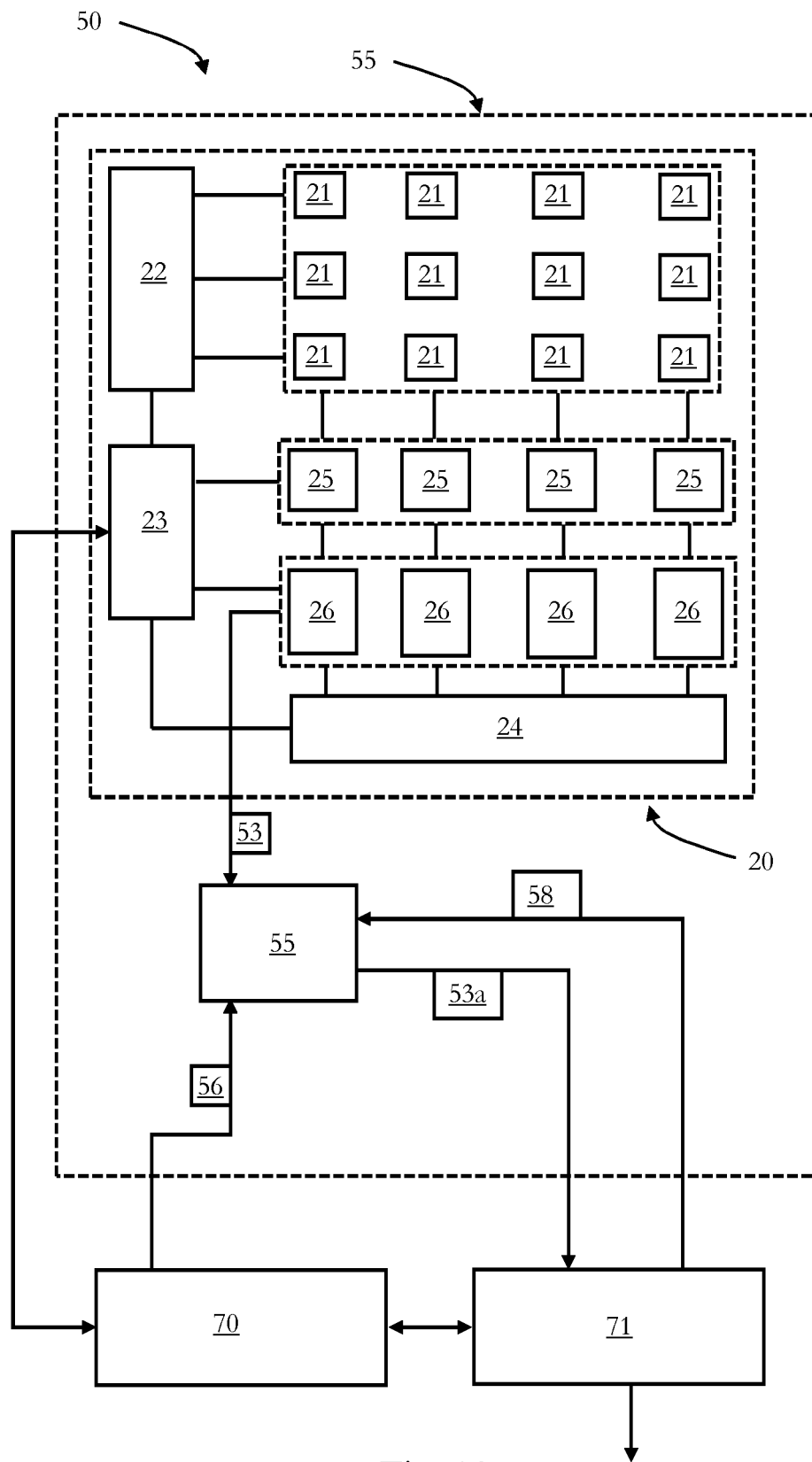
FIG. 10 schematically illustrates in a block diagram a third embodiment of an image processing device including a second embodiment of an image processing circuitry according to the second part of the description.

FIG. 10 schematically illustrates in a block diagram a third embodiment of an image processing device 50 including a second embodiment of an image processing circuitry 55.

The image processing device 50 includes a control 70, a display 51 (not shown), an image processing circuitry 55 and a communication interface 71.

The control 70 includes circuitry (e.g. a CPU, a memory, etc.) for controlling the overall function of the image processing device 50. The control 70 generates a transmission command 56 in response to a touch operation of a user on the display 51 and sends the transmission command 56 to the image processing circuitry 55 (an encryption unit 72).

The communication interface 71 transmits encrypted image data 53a to a receiver device 57 (not shown) and obtains a public key 58 of the receiver device 57 and sends the public key 58 to the image processing circuitry 55 (the encryption unit 72).

The image processing circuitry 55 includes an image sensor 20 and an encryption unit 72.

The image sensor 20 includes a plurality of pixels 21, a row selection logic 22, a timing control 23, a column selection logic 24, a plurality of analog signal processors 25 and a plurality of analog-to-digital (AD) converters 26.

The plurality of pixels 21 is arranged according to a predetermined pattern in rows and columns, each pixel of the plurality of pixels 21 generating an electric signal in accordance with an amount of light incident onto the respective pixel.

The row selection logic 22 selects a row of pixels 21 to output the electric signal to the plurality of analog signal processors 25.

The timing control 23 controls the timing of the row selection logic 22, the column selection logic 24, the plurality of analog signal processors 25 and the plurality of AD converters 26.

The column selection logic 24 selects a column of pixels to output the electric to the plurality of analog signal processors 25.

The plurality of analog signal processors 25 performs predetermined analog signal processing (e.g. frequency filtering, smoothing, etc.) on the electric signal obtained from the plurality of pixels 21 and outputs a processed signal to the plurality of AD converters.

The plurality of AD converters 26 converts the processed signal into digital values (pixel values), thereby generating image data 53. The plurality of AD converters 26 outputs the image data 53.

The encryption unit 72 is implemented as a system-on-a-chip (SoC) and encrypts the obtained image data 53 based on the public key 58 in response to the transmission command 56.

The encryption unit 72 outputs the encrypted image data 53a to the communication interface 71 for transmission to the receiver device 57.

Moreover, the image data 53 is deleted after successful transmission of the encrypted image data 53a to the receiver device 57.

Figure 11A:
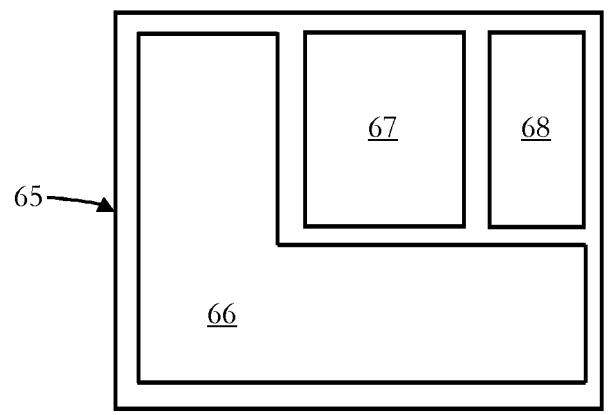
FIG. 11 schematically illustrates embodiments of configurations of an image processing circuitry according to the second part of the description.
Figure 11B:
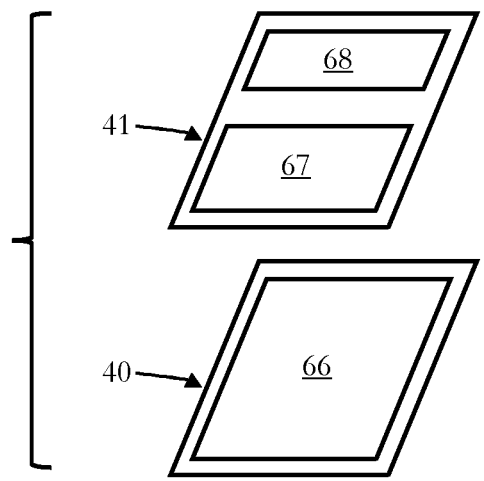
Figure 11C:
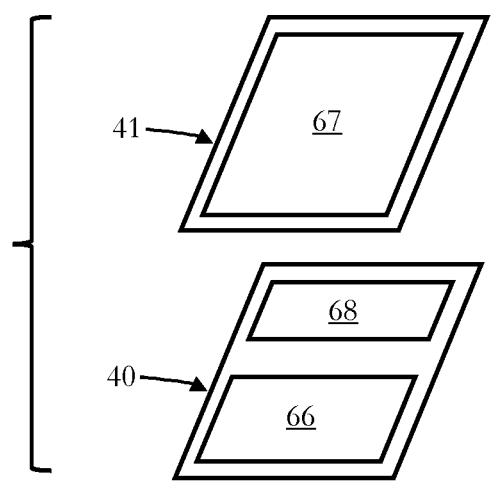

Different embodiments of configurations of an image processing circuitry 65, schematically illustrated in block diagrams, are discussed under reference of FIG. 11A, FIG. 11B and FIG. 11C.

FIG. 11A schematically illustrates an image processing circuitry 65 in a flat configuration on a single semiconductor chip such as, for instance, the image processing circuitry 55 of the embodiment discussed under reference of FIG. 10.

The image processing circuitry 65 includes a logic circuit 66 for signal processing, a pixel circuit 67 and a control unit 68.

The logic circuit 66 includes, for example, the plurality of analog signal processors 25, the plurality of analog-to-digital (AD) converters 26 and the encryption unit 72.

The pixel circuit 67 includes, for example, the plurality of pixels 21, the row selection logic 22 and the column selection logic 24.

The control unit 68 is, for example, the timing control 23.

FIG. 11B schematically illustrates an image processing circuitry 65 in a first stacked configuration. The image processing circuitry 55 of the embodiment discussed under reference of FIG. 10, for example, may be implemented in such a first stacked configuration. The first stacked configuration may correspond to a front-side illuminated image sensor.

In the first stacked configuration, the logic circuit 66, for example, according to the embodiment as discussed under reference of FIG. 11A, is mounted on a first semiconductor chip section 40.

The pixel circuit 67 and the control unit 68, for example, according to the embodiment as discussed under reference of FIG. 11A, are mounted on a second semiconductor chip section 41.

FIG. 11C schematically illustrates an image processing circuitry 65 in a second stacked configuration. The image processing circuitry 55 of the embodiment discussed under reference of FIG. 10, for example, may be implemented in such a second stacked configuration. The second stacked configuration may correspond to a back-side illuminated image sensor.

In the second stacked configuration, the logic circuit 66 and the control unit 68, for example, according to the embodiment as discussed under reference of FIG. 11A, are mounted on the first semiconductor chip section 40.

The pixel circuit 67, for example, according to the embodiment as discussed under reference of FIG. 11A, is mounted on the second semiconductor chip section 41.

It should be recognized that the embodiments of FIG. 11A, FIG. 11B and FIG. 11C describe a flat configuration, a first stacked configuration and a second stacked configuration with an exemplary configuration of the logic circuit 66, the pixel circuit 67 and the control unit 68. The specific configuration of the logic circuit 66, the pixel circuit 67 and the control unit 68 is however given for illustrative purposes only and should not be construed as binding. Further configurations may be apparent to the skilled person.

This embodiment provides stacked image sensors that perform encryption with its computing capabilities, which may improve security, since the stacked sensor may be more difficult to compromise.

Figure 12:
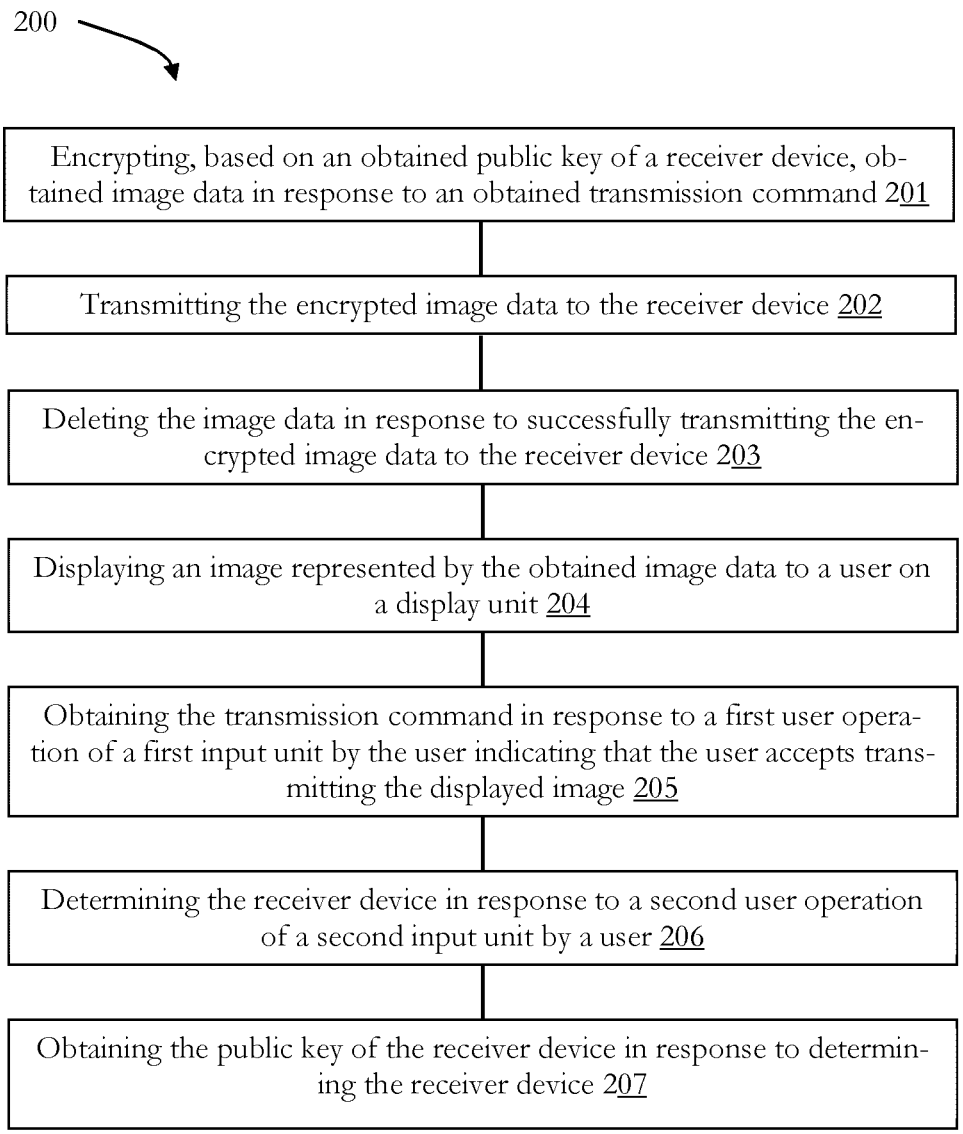
FIG. 12 schematically illustrates in flow diagram a first embodiment of an image processing method according to the second part of the description.

FIG. 12 schematically illustrates in a flow diagram a first embodiment of an image processing method 200.

At 201, based on an obtained public key of a receiver device, obtained image data is encrypted in response to an obtained transmission command.

At 202, the encrypted image data is transmitted to the receiver device, as discussed herein.

At 203, the image data is deleted in response to successfully transmitting the encrypted image data to the receiver device, as discussed herein.

At 204, an image represented by the obtained image data is displayed to a user on a display unit, as discussed herein.

At 205, the transmission command is obtained in response to a first user operation of a first input unit by the user indicating that the user accepts transmitting the displayed image, as discussed herein.

At 206, the receiver device is determined in response to a second user operation of a second input unit by a user, as discussed herein.

At 207, the public key of the receiver device is obtained in response to determining the receiver device, as discussed herein.

FIG. 13 schematically illustrates in a flow diagram a second embodiment of an image processing method 300.

At 301, based on an obtained secret key, obtained image data is encrypted and the secret key encrypted image data is stored, as discussed herein.

At 302, based on the obtained secret key, the secret key encrypted image data is decrypted and, based on an obtained public key of a receiver device, the obtained image data is encrypted in response to an obtained transmission command, as discussed herein.

At 303, the public key encrypted image data is transmitted to the receiver device, as discussed herein.

At 304, the image data is deleted in response to successfully transmitting the public key encrypted image data to the receiver device, as discussed herein.

At 305, an image represented by the obtained image data is displayed to a user on a display unit after decrypting the secret key encrypted image data, as discussed herein.

At 306, the transmission command is obtained in response to a first user operation of a first input unit by the user indicating that the user accepts transmitting the displayed image, as discussed herein.

At 307, the receiver device is determined in response to a second user operation of a second input unit by a user, as discussed herein.

At 308, the public key of the receiver device is obtained in response to determining the receiver device, as discussed herein.

It should be recognized that the embodiments describe methods with an exemplary ordering of method steps. The specific ordering of method steps is however given for illustrative purposes only and should not be construed as binding. For example, the ordering of 204 and 106 in the embodiment of FIG. 12 may be exchanged. Other changes of the ordering of method steps may be apparent to the skilled person.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) An image processing circuitry configured to:
encrypt, based on an obtained public key of a receiver device, obtained image data in response to an obtained transmission command;
transmit the encrypted image data to the receiver device; and
delete the image data in response to successfully transmitting the encrypted image data to the receiver device.

(2) The image processing circuitry of (1), wherein an image represented by the obtained image data is displayed to a user on a display unit, and wherein the transmission command is obtained in response to a first user operation of a first input unit by the user indicating that the user confirms transmitting the displayed image.

(3) The image processing circuitry of (1) or (2), wherein the receiver device is determined in response to a second user operation of a second input unit by a user, and wherein the public key of the receiver device is obtained in response to determining the receiver device.

(4) An image processing circuitry configured to:
encrypt, based on an obtained secret key, obtained image data and store the secret key encrypted image data;
decrypt, based on the obtained secret key, the secret key encrypted image data and encrypt, based on an obtained public key of a receiver device, the obtained image data in response to an obtained transmission command;
transmit the public key encrypted image data to the receiver device; and
delete the image data in response to successfully transmitting the public key encrypted image data to the receiver device.

(5) The image processing circuitry of (4), wherein an image represented by the obtained image data is displayed to a user on a display unit after decrypting the secret key encrypted image data, and wherein the transmission command is obtained in response to a first user operation of a first input unit by the user indicating that the user confirms transmitting the displayed image.

(6) The image processing circuitry of (4) or (5), wherein the receiver device is determined in response to a second user operation of a second input unit by a user, and wherein the public key of the receiver device is obtained in response to determining the receiver device.

(7) An image processing method including:
encrypting, based on an obtained public key of a receiver device, obtained image data in response to an obtained transmission command;
transmitting the encrypted image data to the receiver device; and
deleting the image data in response to successfully transmitting the encrypted image data to the receiver device.

(8) The image processing method of (7) further including:
displaying an image represented by the obtained image data to a user on a display unit; and
obtaining the transmission command in response to a first user operation of a first input unit by the user indicating that the user accepts transmitting the displayed image.

(9) The image processing method of (7) or (8) further including:
determining the receiver device in response to a second user operation of a second input unit by a user; and
obtaining the public key of the receiver device in response to determining the receiver device.

(10) An image processing method including:
encrypting, based on an obtained secret key, obtained image data and store the secret key encrypted image data;
decrypting, based on the obtained secret key, the secret key encrypted image data and encrypting, based on an obtained public key of a receiver device, the obtained image data in response to an obtained transmission command;
transmitting the public key encrypted image data to the receiver device; and
deleting the image data in response to successfully transmitting the public key encrypted image data to the receiver device.

(11) The image processing method of (10) further including:
displaying an image represented by the obtained image data to a user on a display unit after decrypting the secret key encrypted image data; and
obtaining the transmission command in response to a first user operation of a first input unit by the user indicating that the user accepts transmitting the displayed image.

(12) The image processing method of (10) and (11) further including:
determining the receiver device in response to a second user operation of a second input unit by a user; and
obtaining the public key of the receiver device in response to determining the receiver device.

(13) A computer program comprising program code causing a computer to perform the method according to anyone of (1) to (3), when being carried out on a computer.

(14) A non-transitory computer-readable recording medium that stores therein a computer program product, which, when executed by a processor, causes the method according to anyone of (1) to (3) to be performed.

(15) A computer program comprising program code causing a computer to perform the method according to anyone of (4) to (6), when being carried out on a computer.

(16) A non-transitory computer-readable recording medium that stores therein a computer program product, which, when executed by a processor, causes the method according to anyone of (4) to (6) to be performed.

The invention claimed is:

1. An image processing circuitry configured to:
store, based on an obtained command, a first image identifier of first image data or the first image data on a write-once-read-many memory, wherein the first image identifier is generated based on the first image data such that it is unique for the first image data.

2. The image processing circuitry according to claim 1, wherein the first image identifier or the first image data is only stored on the write-once-read-many memory if a first predetermined secret key stored on a first memory and a second predetermined secret key stored on the write-once-read-many are identical.

3. The image processing circuitry according to claim 1, wherein the image processing circuitry is further configured to:
store the first image data on a second memory when the first image identifier is stored on the write-once-read-many memory.

4. The image processing circuitry according to claim 3, wherein the image processing circuitry is further configured to:
retrieve the first image identifier from the write-once-read-many memory when the first image data is retrieved from the second memory.

5. The image processing circuitry according to claim 1, wherein the image processing circuitry is further configured to:
output an indication whether the first image identifier and a second image identifier, generated based on obtained second image data, are identical.

6. The image processing circuitry according to claim 1, wherein the image processing circuitry is further configured to:
output an indication whether the first image identifier and an obtained third image identifier are identical.

7. The image processing circuitry according to claim 1, wherein the command is obtained in response to a user operation.

8. The image processing circuitry according to claim 1, wherein the image processing circuitry includes:
the write-once-read-many memory;
an image sensor generating the first image data; and
an image identifier generator generating the first image identifier based on the generated first image data such that it is unique for the first image data.

9. The image processing circuitry according to claim 8, wherein each of the image identifier generator and the write-once-read-many memory is provided as a separate system-on-a-chip component.

10. The image processing circuitry according to claim 9, wherein the write-once-read-many memory is detachable from the image processing circuitry.

11. The image processing circuitry according to claim 8, wherein the image sensor and the write-once-read-many memory are provided as a stacked monolithic component.

12. The image processing circuitry according to claim 8, wherein the image sensor, the write-once-read-many memory and the image identifier generator are provided as a stacked monolithic component.

13. The image processing circuitry according to claim 7, wherein the image processing circuitry further includes:
an input unit operable by the user, wherein the command is obtained in response to the operation of the input unit by the user.

14. An image processing method comprising:
storing, based on an obtained command, a first image identifier of first image data or the first image data on a write-once-read-many memory, wherein the first image identifier is generated based on the first image data such that it is unique for the first image data.

15. The image processing method according to claim 14, further comprising:
storing the first image identifier or the first image data on the write-once-read-many memory only if a first predetermined secret key stored on a first memory and a second predetermined secret key stored on the write-once-read-many are identical.

16. The image processing method according to claim 14, further comprising:
storing the first image data on a second memory when the first image identifier is stored on the write-once-read-many memory.

17. The image processing method according to claim 16, further comprising:
retrieving the first image identifier from the write-once-read-many memory when the first image data is retrieved from the second memory.

18. The image processing method according to claim 14, further comprising:
outputting an indication whether the first image identifier and a second image identifier, generated based on obtained second image data, are identical.

19. The image processing method according to claim 14, further comprising:
outputting an indication whether the first image identifier and an obtained third image identifier are identical.

20. The image processing method according to claim 14, further comprising:
obtaining the command in response to a user operation.

* * * * *